US012809785B2

(12) United States Patent
Bak et al.

(10) Patent No.: US 12,809,785 B2
(45) Date of Patent: Nov. 24, 2026

(54) DATA SECURITY WHEN TIERING VOLATILE AND NON- VOLATILE BYTE-ADDRESSABLE MEMORY

(71) Applicant: MICROSOFT TECHNOLOGY LICENSING, LLC, Redmond, WA (US)

(72) Inventors: Yevgeniy Bak, Redmond, WA (US); Mehmet Iyigun, Kirkland, WA (US); Landy Wang, Honolulu, HI (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 539 days.

(21) Appl. No.: 18/253,263

(22) PCT Filed: Dec. 2, 2021

(86) PCT No.: PCT/US2021/072705

§ 371 (c)(1),
(2) Date: May 17, 2023

(87) PCT Pub. No.: WO2022/133388

PCT Pub. Date: Jun. 23, 2022

(65) Prior Publication Data

US 2023/0409490 A1 Dec. 21, 2023

(30) Foreign Application Priority Data

Dec. 15, 2020 (LU) ........................................ 102287

(51) Int. Cl.
*G06F 12/14* (2006.01)
*G06F 12/0802* (2016.01)

(52) U.S. Cl.
CPC ...... *G06F 12/1408* (2013.01); *G06F 12/0802* (2013.01); *G06F 2212/1052* (2013.01)

(58) Field of Classification Search
CPC ............. G06F 12/1408; G06F 12/0802; G06F 2212/1052; G06F 12/124; G06F 12/0868; G06F 2212/205; G06F 2212/214
See application file for complete search history.

(56) References Cited

U.S. PATENT DOCUMENTS

| | | | |
|---|---|---|---|
| 5,119,290 | A | 6/1992 | Loo et al. |
| 5,680,573 | A | 10/1997 | Rubin et al. |

(Continued)

FOREIGN PATENT DOCUMENTS

| | | | |
|---|---|---|---|
| CN | 1512354 | A | 7/2004 |
| CN | 101101563 | A | 1/2008 |

(Continued)

OTHER PUBLICATIONS

Communication under 71(3) Received for European Application No. 19791159.7, mailed on Nov. 22, 2023, 8 pages.

(Continued)

*Primary Examiner* — Christopher B Robinson
*Assistant Examiner* — Tania M Pena-Santana
(74) *Attorney, Agent, or Firm* — Workman Nydegger

(57) ABSTRACT

Ensuring data security when tiering volatile and non-volatile byte-addressable memory. A portion of cache data stored in a first memory that is byte-addressable and volatile is identified for copying to a second memory that is byte-addressable and non-volatile. The portion of cache data is associated with cryptographic requirements for storing the portion of cache data on non-volatile storage. Cryptographic capabilities of the second memory are identified. When each of the cryptographic requirements is met by the cryptographic capabilities, the portion of cache data is copied to the second memory while relying on the second memory to encrypt the portion of cache data. When at least one cryptographic requirement is not met by the cryptographic
(Continued)

capabilities, the portion of cache data is encrypted to generate an encrypted portion of cache data, and the encrypted portion of cache data is copied to the second memory.

20 Claims, 4 Drawing Sheets

(56) References Cited

U.S. PATENT DOCUMENTS 5,829,038 A 10/1998 Merrell et al.
5,897,634 A 4/1999 Attaluri et al.
5,933,846 A 8/1999 Endo
5,940,823 A 8/1999 Schreiber et al.
5,978,892 A 11/1999 Noel et al.
6,438,672 B1 8/2002 Fischer et al.
6,625,725 B1 9/2003 Wu et al.
6,643,640 B1 11/2003 Getchius et al.
6,732,124 B1 5/2004 Koseki et al.
6,754,662 B1 6/2004 Li
6,826,615 B2 11/2004 Barrall et al.
6,910,106 B2 6/2005 Sechrest
7,330,933 B2 2/2008 Crick
7,664,938 B1 2/2010 Tripathi et al.
7,673,105 B2 3/2010 Stanfill
7,689,607 B2 3/2010 Oks et al.
7,872,657 B1 1/2011 Edmondson et al.
7,962,693 B1 6/2011 Bumbulis
8,010,747 B2 8/2011 Van
8,145,859 B2 3/2012 Park et al.
8,161,241 B2 4/2012 Bhattacharjee et al.
8,194,452 B2 6/2012 Rao et al.
8,250,111 B2 8/2012 Huras et al.
8,335,893 B2 12/2012 Tagawa
8,375,178 B2 2/2013 Rana et al.
8,438,337 B1 5/2013 Garg et al.
8,549,528 B2 10/2013 Nakajima et al.
8,619,452 B2 12/2013 Rajan et al.
8,863,091 B2 10/2014 Dageville et al.
8,898,388 B1 11/2014 Kimmel et al.
8,914,567 B2 12/2014 Miroshnichenko et al.
9,020,987 B1 4/2015 Nanda et al.
9,152,353 B1 10/2015 Wang et al.
9,501,398 B2 11/2016 George et al.
9,552,176 B2 1/2017 Lee et al.
9,678,689 B2 6/2017 Tipton et al.
10,146,942 B2 12/2018 Martinez
11,398,894 B2 7/2022 Awad
2002/0013887 A1 1/2002 Ting
2002/0116581 A1 8/2002 Donoghue et al.
2004/0078541 A1 4/2004 Lightstone et al.
2004/0205297 A1 10/2004 Bearden et al.
2005/0005080 A1 1/2005 Dunshea et al.
2005/0138307 A1 6/2005 Grimsrud et al.
2005/0262059 A1 11/2005 White
2007/0033318 A1 2/2007 Gilday et al.
2007/0083716 A1 4/2007 Rajamony et al.
2007/0094450 A1 4/2007 Vanderwiel
2007/0288708 A1 12/2007 Saha et al.
2008/0005459 A1 1/2008 Norman et al.
2008/0022040 A1 1/2008 Joukan et al.
2008/0040748 A1 2/2008 Miyaki
2008/0059707 A1 3/2008 Makineni et al.
2008/0147974 A1 6/2008 Madison et al.
2008/0244370 A1 10/2008 Lam
2008/0270738 A1 10/2008 Makphaibulchoke et al.
2009/0024800 A1 1/2009 Flemming et al.
2009/0031072 A1 1/2009 Sartore
2009/0055591 A1 2/2009 Miwa et al.
2009/0158085 A1 6/2009 Kern et al.
2009/0177667 A1 7/2009 Ramos et al.
2009/0210445 A1 8/2009 Draese et al.
2010/0082919 A1 4/2010 Chen et al.
2010/0153649 A1 6/2010 Li et al.
2011/0029723 A1 2/2011 Lee et al.
2011/0066808 A1 3/2011 Flynn et al.
2011/0145476 A1 6/2011 Hulbert et al.
2011/0219169 A1 9/2011 Zhang et al.
2012/0072652 A1 3/2012 Cells
2012/0233438 A1* 9/2012 Bak ........................ G06F 12/08 711/E12.078
2013/0067192 A1 3/2013 Yaari
2013/0275703 A1 10/2013 Schenfeld et al.
2013/0339572 A1 12/2013 Fanning et al.
2014/0089450 A1 3/2014 Raindel et al.
2014/0089451 A1 3/2014 Eran et al.
2014/0188952 A1 7/2014 Killamsetti et al.
2014/0195750 A1 7/2014 Zhang et al.
2014/0310451 A1 10/2014 Lee et al.
2014/0359203 A1 12/2014 Tipton et al.
2014/0359248 A1 12/2014 Peters et al.
2015/0134892 A1 5/2015 Goda
2015/0143032 A1 5/2015 Hashimoto
2015/0178202 A1 6/2015 Sankaran et al.
2015/0200002 A1 7/2015 Lin et al.
2015/0277930 A1* 10/2015 Sarangdhar ........... G06F 21/572 713/2
2015/0281336 A1* 10/2015 Beale ................ G06F 15/17331 709/201
2015/0324281 A1 11/2015 Takefman et al.
2015/0355981 A1 12/2015 Bumbulis et al.
2015/0370704 A1* 12/2015 Kato .................. G06F 12/0638 713/193
2016/0012155 A1 1/2016 Shivarudraiah et al.
2016/0026387 A1 1/2016 Lin et al.
2016/0071233 A1 3/2016 Macko et al.
2016/0371162 A1 12/2016 Booss et al.
2017/0046259 A1 2/2017 Mckean et al.
2017/0115896 A1 4/2017 Brouer
2017/0131909 A1 5/2017 Bakke et al.
2017/0262172 A1 9/2017 Xu et al.
2017/0262207 A1 9/2017 Tipton et al.
2018/0005670 A1 1/2018 Lee et al.
2018/0018218 A1 1/2018 Rat et al.
2018/0046556 A1 2/2018 Marathe et al.
2018/0307626 A1 10/2018 Chessin
2018/0365141 A1 12/2018 Dragojevic et al.
2019/0042416 A1 2/2019 Doshi et al.
2019/0042417 A1 2/2019 Sukhomlinov et al.
2019/0065383 A1 2/2019 Loaiza et al.
2019/0179763 A1 6/2019 Lo
2019/0187897 A1 6/2019 Badam et al.
2019/0392166 A1* 12/2019 Awad .................. G06F 21/6281
2020/0092098 A1* 3/2020 Zeh ......................... G06F 21/72
2020/0125290 A1 4/2020 Shah et al.
2020/0159621 A1 5/2020 Velayuthaperumal et al.
2020/0371914 A1 11/2020 Wang et al.
2020/0371936 A1 11/2020 Christiansen et al.
2021/0124678 A1 4/2021 Dragojevic et al.
2021/0263779 A1* 8/2021 Haghighat ............ G06F 9/5061
2022/0100403 A1* 3/2022 Tiwari ................ G06F 11/1441
2022/0342807 A1 10/2022 Dragojevic et al.

FOREIGN PATENT DOCUMENTS

CN 101320353 A 12/2008
CN 101459726 A 6/2009
CN 101615191 A 12/2009
CN 101887350 A 11/2010
CN 101937374 A 1/2011
CN 104011690 A 8/2014
CN 105612503 A 5/2016
CN 108959129 A 12/2018
EP 3170087 A1 5/2017
EP 3663927 A1 6/2020
JP H05158782 A 6/1993
JP H08153014 A 6/1996
JP H08235042 A 9/1996
JP 2001282617 A 10/2001
JP 2003216460 A 7/2003
JP 2004362464 A 12/2004
JP 2005173637 A 6/2005
JP 2005539309 A 12/2005
JP 2006185169 A 7/2006

(56) References Cited

FOREIGN PATENT DOCUMENTS

| | | | |
|---|---|---|---|
| RU | 2257609 | C2 | 7/2005 |
| WO | 2013048483 | A1 | 4/2013 |
| WO | 2016111702 | A1 | 7/2016 |

OTHER PUBLICATIONS

U.S. Appl. No. 14/208,268, filed Mar. 13, 2014.
U.S. Appl. No. 12/717,139, filed Mar. 4, 2010.
U.S. Appl. No. 13/305,670, filed Nov. 28, 2011.
U.S. Appl. No. 61/497,420, filed Jun. 15, 2011.
U.S. Appl. No. 15/608,690, filed May 30, 2017.
U.S. Appl. No. 14/036,298, filed Sep. 25, 2013.
U.S. Appl. No. 61/828,636, filed May 29, 2013.
U.S. Appl. No. 17/860,098, filed Jul. 7, 2022.
U.S. Appl. No. 17/138,390, filed Dec. 30, 2020.
U.S. Appl. No. 15/638,164, filed Jun. 29, 2017.
U.S. Appl. No. 16/168,032, filed Oct. 23, 2018.
"Cost and Performance Benefits of Deploying Microsoft SQL Server on HPE Persistent Memory and Microsoft Storage Spaces", In Technical White paper of Hewlett Packard Enterprise, Apr. 2017, 14 Pages.
"Deploying Server Persistent Memory on Windows Server 2012 R2", In Technical White paper of Hewlett Packard Enterprise, Dec. 2017, 14 Pages.
"Exadata Smart Flash Cache and the Sun Oracle Database Machine", Published in Oracle White Paper, Oct. 2009, 10 Pages.
"Flash Disruption Comes to Server Main Memory", Retrieved From: https://www.nextplatform.com/2015/08/05/flash-disruption-comes-to-server-main-memory/, Aug. 5, 2015, 8 Pages.
"HPE NVDIMMs", Retrieved From: https://www.hpe.com/us/en/product-catalog/servers/persistent-memory/pip.hpe-persistent-memory.1008649009.html, Jan. 1, 2018, 3 Pages.
"HPE NVDIMMs QuickSpecs", Retrieved From: https://support.hpe.com/hpesc/public/docDisplay? docLocale=en_US&docid=c04939369, Feb. 12, 2018, 7 Pages.
"HPE Persistent Memory for HPE ProLiant Servers", In Technical White paper of Hewlett Packard Enterprise, Jan. 1, 2016, 10 Pages.
"HPE Reference Architecture for Microsoft SQL Server 2016 on HPE ProLiant DL380 Gen9 with HPE Persistent Memory", In Technical White paper of Hewlett Packard Enterprise, Jan. 1, 2017, 17 Pages.
"Improving Microsoft SQL Server Database performance with HPE Persistent Memory on HPE ProLiant DL380 Gen9", Retrieved From: https://www.hpe.com/psnow/doc/4aa6-7123enw, Jan. 1, 2016, 15 Pages.
"Improving Oracle Database performance with HPE Persistent Memory on HPE ProLiant DL380 Gen9", Retrieved From: https://manualzz.com/doc/32658498/improving-oracle-database-performance-with-hpe-persistent, Jan. 1, 2018, 14 Pages.
"Intel Lets Slip Broadwell, Skylake Xeon Chip Specs", Retrieved From: https://www.nextplatform.com/2015/05/26/intel-lets-slip-broadwell-skylake-xeon-chip-specs/, May 26, 2015, 7 Pages.
"Like Flash, 3D XPoint Enters the Datacenter as Cache", Retrieved From: https://www.nextplatform.com/2017/03/20/like-flash-3d-xpoint-enters-datacenter-cache/, Mar. 20, 2017, 13 Pages.
"Lock-Freedom without Garbage Collection", Retrieved from: https://aturon.github.io/blog/2015/08/27/epoch/, Aug. 27, 2015, 15 Pages.
"NVDIMM—Fastest Tier in Your Storage Strategy", Published in Viking Technology Whitepaper, Jan. 2014, 8 Pages.
"NVDIMM: Can't Wait for 3D XPoint, Can't Rely on DRAM Alone", Retrieved From: https://www.nextplatform.com/2015/12/07/nvdimm-cant-wait-for-3d-xpoint-cant-rely-on-dram-alone/, Dec. 7, 2015, 8 Pages.
"NVDIMM: Persistent Memory Performance", Retrieved From: https://www.micron.com/-/media/client/global/documents/products/product-flyer/nvdimm_flyer.pdf?la=en, Jan. 1, 2016, 2 Pages.
"Persistent Memory Programming", Retrieved from: http://pmem.io/, Retrieved on: Mar. 21, 2017, 3 Pages.
"Scaling the Growing System Memory Hierarchy", Retrieved From: https://www.nextplatform.com/2015/07/29/scaling-the-growing-system-memory-hierarchy/, Jul. 29, 2015, 9 Pages.
"Speed vs. Latency", Retrieved from: https://blog.csdn.net/SH_UANG/article/details/72905254, Jun. 7, 2017, 4 Pages.
"Using NVDIMM Persistent Memory Server Technology with Linux", Retrieved from: https://h50146.www5.hpe.com/products/software/oe/linux/mainstream/support/whitepaper/pdfs/a00036172enw.pdf, Nov. 2017, 7 Pages.
"Extended European Search Report Issued in Application No. 11751324.2", Mailed Date: Dec. 12, 2014, 9 Pages.
"Notice of Allowance Issued in European Patent Application No. 11751324.2", Mailed Date: Jul. 27, 2017, 1 Page.
"Notice of Allowance Issued in European Patent Application No. 11751324.2", Mailed Date: Mar. 13, 2017, 7 Pages.
"Non Final Office Action Issued in U.S. Appl. No. 12/717,139", Mailed Date: Jul. 1, 2013, 13 Pages.
"Notice of Allowance Issued in U.S. Appl. No. 12/717,139", Mailed Date: Dec. 6, 2013, 20 Pages.
"Final Office Action Issued in U.S. Appl. No. 13/305,670", Mailed Date: Jan. 3, 2014, 23 Pages.
"Non Final Office Action Issued in U.S. Appl. No. 13/305,670", Mailed Date: May 22, 2013, 21 Pages.
"Non Final Office Action Issued in U.S. Appl. No. 13/305,670", Mailed Date: Jul. 16, 2015, 9 Pages.
"Non Final Office Action Issued in U.S. Appl. No. 13/305,670", Mailed Date: Apr. 10, 2015, 24 Pages.
"Notice of Allowance Issued in U.S. Appl. No. 13/305,670", Mailed Date: Sep. 14, 2015, 12 Pages.
"Final Office Action Issued in U.S. Appl. No. 14/036,298", Mailed Date: Nov. 23, 2016, 10 Pages.
"Non Final Office Action Issued in U.S. Appl. No. 14/036,298", Mailed Date: May 4, 2016, 9 Pages.
"Notice of Allowance Issued in U.S. Appl. No. 14/036,298", Mailed Date: Feb. 14, 2017, 5 Pages.
"Non Final Office Action Issued In U.S. Appl. No. 14/208,268", Mailed Date: Oct. 2, 2014, 13 Pages.
"Notice of Allowance Issued in U.S. Appl. No. 14/208,268", Mailed Date: Mar. 24, 2015, 9 Pages.
"Notice of Allowance Issued in European Patent Application No. 14802963.0", Mailed Date: Mar. 4, 2021, 2 Pages.
"Notice of Allowance Issued in European Patent Application No. 14802963.0", Mailed Date: Jun. 4, 2020, 7 Pages.
"Notice of Allowance Issued in European Patent Application No. 14802963.0", Mailed Date: Nov. 5, 2020, 7 Pages.
"Office Action Issued in European Patent Application No. 14802963.0", Mailed Date: Jan. 2, 2018, 6 Pages.
"Non Final Office Action Issued In U.S. Appl. No. 15/608,690", Mailed Date: Aug. 7, 2018, 11 Pages.
"Notice of Allowance Issued in U.S. Appl. No. 15/608,690", Mailed Date: Oct. 18, 2018, 7 Pages.
"Final Office Action Issued In U.S. Appl. No. 15/638,164", Mailed Date: Nov. 8, 2019, 15 Pages.
"Non Final Office Action Issued in U.S. Appl. No. 15/638,164", Mailed Date: Mar. 19, 2019, 17 Pages.
"Notice of Allowance Issued in U.S. Appl. No. 15/638,164", Mailed Date: Sep. 10, 2020, 9 Pages.
"Final Office Action Issued In U.S. Appl. No. 16/168,032", Mailed Date: Jun. 2, 2021, 20 Pages.
"Non Final Office Action Issued in U.S. Appl. No. 16/168,032", Mailed Date: Mar. 4, 2021, 17 Pages.
"Notice of Allowance Issued in U.S. Appl. No. 16/168,032", Mailed Date: Sep. 2, 2021, 5 Pages.
"Notice of Allowance Issued in U.S. Appl. No. 17/138,390", Mailed Date: Mar. 9, 2022, 9 Pages.
"Notice of Allowance Issued in U.S. Appl. No. 17/860,098", Mailed Date: May 24, 2023, 8 Pages.
"Notice of Allowance Issued in European Patent Application No. 18731271.5", Mailed Date: Aug. 11, 2022, 2 Pages.
Park, et al., "Linux Kernel Support to Exploit Phase Change Memory", In Proceedings of Linux Symposium, Jul. 13, 2010, 10 Pages.
"Office Action Issued in European Patent Application No. 18731271.5", Mailed Date: Nov. 8, 2021, 14 Pages.

(56) References Cited

OTHER PUBLICATIONS

"Notice of Allowance Issued in China Patent Application No. 201180012126.5", Mailed Date: May 6, 2013, 6 Pages.
"Office Action and Search Report Issued in China Patent Application No. 201180012126.5", Mailed Date: Feb. 27, 2013, 10 Pages.
"Notice of Allowance Issued in Japanese Patent Application No. 2012-556228", Mailed Date: Feb. 24, 2015, 5 Pages.
"Office Action Issued in Japanese Patent Application No. 2012-556228", Mailed Date: Nov. 4, 2014, 6 Pages.
"Office Action and Search Report Issued in Chinese Patent Application No. 201480030762.4", Mailed Date: Nov. 27, 2017, 10 Pages.
"Notice of Allowance Issued in Russian Patent Application No. 2015151012", Mailed Date: Aug. 1, 2018, 18 Pages.
"Office Action Issued in Russian Patent Application No. 2015151012", Mailed Date: Apr. 18, 2018, 9 Pages.
"Notice of Allowance Issued in Japanese Patent Application No. 2016-516745", Mailed Date: Mar. 12, 2018, 5 Pages.
"Office Action Issued in Indian Patent Application No. 202147018690", Mailed Date: Jan. 24, 2023, 6 Pages.
"Extended European Search Report Issued in European Patent Application No. 22187128.8", Mailed Date: Dec. 1, 2022, 12 Pages.
"Office Action Issued in Indian Patent Application No. 7229/CHENP/2015", Mailed Date: Aug. 3, 2020, 6 Pages.
Arulraj, et al., "Bridging The Archipelago Between Row-Stores and Column-Stores for Hybrid Workloads", In Proceedings of International Conference on Management of Data, Jun. 26, 2016, pp. 583-598.
Arulraj, et al., "How to Build a Non-Volatile Memory Database Management System", In Proceedings of SIGMOD, May 14, 2017, pp. 1753-1758.
Arulraj, et al., "Let's Talk About Storage & Recovery Methods for Non-Volatile Memory Database Systems", In Proceedings of the ACM SIGMOD International Conference on Management of Data, May 31, 2015, pp. 707-722.
Arulraj, et al., "Write-Behind Logging", In Proceedings of the VLDB Endowment, vol. 10, Issue 4, Nov. 1, 2016, pp. 337-348.
Athanassoulis, et al., "Flash in a DBMS: Where and How?", In Journal of IEEE Data Engineering Bulletin, vol. 33, Dec. 7, 2010, pp. 1-7.
Bhandari, et al., "Makalu: Fast Recoverable Allocation of Non-volatile Memory", In Journal of ACM SIGPLAN Notices, vol. 51, Issue 10, Nov. 2, 2016, pp. 677-694.
Bhattacharjee, et al., "Enhancing Recovery Using an SSD Buffer Pool Extension", In Proceedings of Seventh International Workshop on Data Management on New Hardware, Jun. 13, 2011, pp. 10-16.
"Office Action Issued in Brazilian Patent Application No. BR112015029108-2", Mailed Date: Feb. 12, 2020, 5 Pages.
Canim, et al., "SSD Bufferpool Extensions for Database Systems", In Proceedings of VLDB Endowment, vol. 3, Issue 2, Sep. 1, 2010, pp. 1435-1446.
Chang, et al., "Understanding Latency Variation in Modern DRAM Chips: Experimental Characterization, Analysis, and Optimization", In Proceedings of ACM SIGMETRICS International Conference on Measurement and Modeling of Computer Science, Jun. 14, 2016, 14 Pages.
Coburn, et al., "From ARIES to MARS: Transaction Support for Next-Generation, Solid-State Drives", In Proceedings of the Twenty-Fourth ACM Symposium on Operating Systems Principles, Nov. 3, 2013, pp. 197-212.
Coburn, et al., "NV-Heaps: Making Persistent Objects Fast and Safe with Next-Generation, Non-Volatile Memories", In Journal of ACM SIGARCH Computer Architecture News, vol. 39, Issue 1, Mar. 5, 2011, pp. 105-117.
Cornwell, et al., "Accelerating Database Performance With Flash Storage Technology", Published by Sun Microsystems, Oct. 12, 2009, 27 Pages.
Debrabant, et al., "A Prolegomenon on OLTP Database Systems for Non-Volatile Memory", In Proceedings of the VLDB Endowment, vol. 7, Issue 14, Jan. 1, 2014, 7 Pages.
Dhiman, et al., "PDRAM: A Hybrid PRAM and DRAM Main Memory System", In Proceedings of the 46th Annual Design Automation Conference, Jul. 26, 2009, pp. 664-669.
Do, et al., "Turbocharging DBMS Buffer Pool Using SSDs", In Proceedings of ACM SIGMOD International Conference on Management of Data, Jun. 12, 2011, pp. 1113-1124.
Effelsberg, et al., "Principles of Database Buffer Management", In Journal of ACM Transactions on Database Systems, vol. 9, Issue 4, Dec. 5, 1984, pp. 560-595.
Eisner, et al., "Quill: Exploiting Fast Non-Volatile Memory by Transparently Bypassing the File System", In UCSD CSE Technical Report, CS2013-0991, Jan. 28, 2013, 6 Pages.
Fraser, Keir, "Practical Lock-Freedom", In PhD thesis, University of Cambridge, Feb. 2004, 116 Pages.
Freitas, et al., "Storage-Class Memory: The Next Storage System Technology", In IBM Journal of Research and Development, vol. 52, Issue 4/5, Jul. 2008, pp. 439-447.
Haerder, et al., "Principles of Transaction-Oriented Database Recovery", In Journal of ACM Computing Surveys, vol. 15, Issue 4, Dec. 2, 1983, pp. 287-317.
Hutsell, Woody, "Faster SQL Server Database Access with the RamSan-210", Retrieved from: https://web.archive.org/web/20060314173725/http://www.texmemsys.com/files/f000128.pdf, Nov. 1, 2001, 9 Pages.
Kang, et al., "Cache Strategies for Semantic Prefetching Data", In Proceedings of Seventh International Conference on Web-Age Information Management Workshops, Jun. 17, 2006, 8 Pages.
Kim, et al., "NVWAL: Exploiting NVRAM in Write-Ahead Logging", In Journal of ACM SIGPLAN Notices, vol. 51, Issue 4, Apr. 2, 2016, pp. 385-398.
Kwon, et al., "A Case Study on the Application of Real Phase-Change RAM to Main Memory Subsystem", In Proceedings of Design, Automation & Test in Europe Conference & Exhibition, Mar. 12, 2012, 4 Pages.
Lee, et al., "A Case for Flash Memory SSD in Enterprise Database Applications", In Proceedings of ACM SIGMOD International Conference on Management of Data, Jun. 9, 2008, pp. 1075-1086.
Lee, et al., "Phase Change Memory Architecture and the Quest for Scalability", In Journal of Communications of the ACM, vol. 53, Issue 7, Jul. 2010, pp. 99-106.
"Search Report and Written Opinion Issued in Luxembourg Application No. LU102287", Mailed Date: Aug. 27, 2021, 10 Pages.
Lung, Hsiang-Lan, "Phase Change Memory: Replacement or Transformational", In Proceedings of LETI 4th Workshop on Innovative Memory Technologies, Jun. 21, 2012, 35 Pages.
Meier, et al., "Improving SQL Server Performance", Retrieved From: https://web.archive.org/web/20100304025523/http://msdn.microsoft.com/en-us/library/ms998577.aspx, May 2004, 32 Pages.
Mohan, et al., "ARIES: A Transaction Recovery Method Supporting Fine-Granularity Locking and Partial Rollbacks Using Write-Ahead Logging", In Journal of ACM Transactions on Database Systems, vol. 17, Issue 1, Mar. 1, 1992, pp. 94-162.
Moraru, et al., "Persistent, Protected and Cached: Building Blocks for Main Memory Data Stores", In CMU Parallel Data Lab Technical Report, CMU-PDL-11-114, Dec. 2011, 24 Pages.
Narayanan, et al., "Migrating Server Storage to SSDs: Analysis of Tradeoffs", In Proceedings of the 4th ACM European Conference on Computer Systems, Apr. 1, 2009, 14 Pages.
Otto, Adrian, "Memcached: More Cache = Less Cash!", Retrieved From: https://web.archive.org/web/20090927070606/http://www.rackspacecloud.com/blog/2009/07/29/memcached-more-cache-less-cash/, Jul. 29, 2009, 8 Pages.
Ousterhout, "Can we Make This Easier?", In Proceedings of the USENIX Annual Technical Conference, Jan. 1, 2014, 2 Pages.
Park, et al., "High-Performance Scalable Flash File System Using Virtual Metadata Storage With Phase-Change RAM", In Journal of IEEE Transactions on Computers, vol. 60, Issue 3, Mar. 2011, pp. 321-334.
Pavlo, Andrew, "Emerging Hardware Trends in Large-Scale Transaction Processing", Retrieved from: https://www.cs.cmu.edu/~pavlo/static/papers/IC_20150501_May_2015.pdf, May 2015, 4 Pages.

(56) References Cited

OTHER PUBLICATIONS

Zhang, et al., "Write-Combined Logging: An Optimized Logging for Consistency in NVRAM", In Journal of Scientific Programming, Jan. 1, 2015, pp. 1-14.
"International Search Report and Written Opinion Issued in PCT Application No. PCT/US11/26930", Mailed Date: Nov. 17, 2011, 6 Pages.
"International Search Report and Written Opinion Issued in PCT Application No. PCT/US19/055277", Mailed Date: Jan. 10, 2020, 10 Pages.
"International Search Report and Written Opinion Issued in PCT Application No. PCT/US2014/039634", Mailed Date: Feb. 10, 2015, 9 Pages.
"Second Written Opinion Issued in PCT Application No. PCT/US2014/039634", Mailed Date: Sep. 10, 2015, 6 Pages.
"International Search Report and Written Opinion Issued in PCT Application No. PCT/US2018/034248", Mailed Date: Dec. 5, 2018, 15 Pages.
"Invitation To Pay Additional Fee Issued In PCT Application No. PCT/US2018/034248", Mailed Date: Aug. 14, 2018, 12 Pages.
"International Search Report and Written Opinion Issued in PCT Application No. PCT/US21/072705", Mailed Date: Feb. 24, 2022, 12 Pages.
Pellegrini, et al., "DI-DyMeLoR: Logging only Dirty Chunks for Efficient Management of Dynamic Memory Based Optimistic Simulation Objects", In Proceedings of ACM/IEEE/SCS 23rd Workshop on Principles of Advanced and Distributed Simulation, Jun. 22, 2009, 9 Pages.
Pullen, Tom, "Analyzing SQL Server 2000 Data Caching", Retrieved From: https://web.archive.org/web/20100216092608/http://www.sql-server-performance.com/articles/per/sql2000_data_caching_p1.aspx, May 3, 2005, 4 Pages.
Qureshi, et al., "Scalable High Performance Main Memory System Using Phase-Change Memory Technology", In Proceedings of 36th Annual International Symposium on Computer Architecture, Jun. 20, 2009, pp. 24-33.
Ramos, et al., "Page Placement in Hybrid Memory Systems", In Proceedings of the International Conference on Supercomputing, May 31, 2011, pp. 85-95.
Schwalb, et al., "nvm malloc: Memory Allocation for NVRAM", In Proceedings of 41st International Conference on Very Large Data Bases, Aug. 31, 2015, pp. 1-12.
Swart, et al., "This is your Database on Flash: Insights from Oracle Development", Retrieved from: https://www.oracle.com/technetwork/cn/database/oracleflash15-132739.pdf, Retrieved On: Jan. 21, 2010, 35 Pages.
Viglas, Stratisd. , "Write-Limited Sorts and Joins for Persistent Memory", In Proceedings of the VLDB Endowment, vol. 7, Issue 5, Jan. 1, 2014, pp. 413-424.
Volos, et al., "Mnemosyne: Lightweight Persistent Memory", In Journal of Acm Sigarch Computer Architecture News, vol. 39, Issue 1, Mar. 5, 2011, pp. 91-103.
Wang, Yongkun, "Research on High Performance Database Management Systems with Solid State Disks", Dissertation submitted to University of Tokyo for degree of Doctor of Philosphy, Dec. 2010, 109 Pages.
Wu, et al., "SCMFS : A File System for Storage Class Memory", In Proceedings of International Conference for High Performance Computing, Networking, Storage and Analysis, Nov. 12, 2011, 11 Pages.
"Notice of Allowance Issued in European Patent Application No. 18731271.5", Mailed Date: Apr. 21, 2022, 7 Pages.
Communication under Rule 71(3) received in European Application No. 22187128.8, mailed on Aug. 22, 2024, 7 pages.
Decision to Grant pursuant to Article 97(1) received in European Application No. 22187128.8, mailed on Nov. 28, 2024, 02 pages.
Notice of Allowance Received for Chinese Application No. 201980069988.8, mailed on Feb. 21, 2025, 04 pages (English Translation Provided).
Communication Pursuant to Rules 70(2) and 70a(2) EPC received for European Patent Application No. 22187128.8, Mailed on Jan. 10, 2023, 2 Pages.
Communication pursuant to Rules 70(2) and 70a(2) Received for European Application No. 11751324.2, mailed on Jan. 12, 2015, 1 page.
Communication under Rule 71(3) EPC Received for European Application No. 21830583.7, mailed on Jan. 8, 2024, 9 pages.
Decision to Grant Received for European Application No. 19791159.7, mailed on Mar. 14, 2024, 2 pages.
Decision to Grant Received for European Application No. 21830583.7, mailed on Apr. 25, 2024, 2 pages.
Intimation of Grant received for Indian Application No. 7229/CHENP/2015, Mailed on Nov. 10, 2022, 1 Page.
Notice of Allowance for Chinese Patent Application No. 201480030762.4 mailed on Nov. 5, 2018, 1 Page. (English Translation not Provided).
Notice of Allowance Received for Brazil Application No. BR112015029108-2, mailed on Mar. 15, 2022, 2 pages. (English Translation is not Provided).
"Study on Buffer Mechanism for HeterogeneousMulti-Processor Architecture," Science & Technology Information, Issue No. 34, 2008, 4pages.
Office Action Received for Chinese Application No. 201980069988.8, mailed on Jun. 6, 2024, 6 pages (English Translation Provided).
Intimation of Grant received for Indian Application No. 202147018690, mailed on Feb. 25, 2026, 1 page.
Examination Report Received for Indian Patent Application No. 202317040009, mailed on Jun. 12, 2026, 10 pages.

* cited by examiner

DATA SECURITY WHEN TIERING VOLATILE AND NON- VOLATILE BYTE-ADDRESSABLE MEMORY

CROSS-REFERENCE TO RELATED APPLICATIONS

The present application is a U.S. National Stage of International Application No. PCT/US2021/072705, filed on Dec. 2, 2021, designating the United States and claiming the priority of Luxembourg Patent Application No. LU102287 filed with the Luxembourg Patent Office on Dec. 15, 2020. All of the aforementioned applications are incorporated herein in their respective entirety by this reference.

TECHNICAL FIELD

The present disclosure relates to systems, methods, and devices that manage communication of data between volatile and non-volatile byte-addressable memory tiers.

BACKGROUND

Conventional computer systems have primarily utilized two categories of writable data storage media: volatile byte-addressable memory (e.g., dynamic random-access memory, or DRAM) that loses its contents unless it is being actively refreshed, and non-volatile block-addressable (e.g., blocks of 512 bytes, 4 k bytes, etc.) storage devices such as hard disk drives (HDDs), solid-state drives (SSDs), etc. that retain their contents even in the absence of electrical power. In general, volatile byte-addressable memory has been characterized by lower access latencies and higher bandwidth than non-volatile block-addressable storage devices. In operation, computer systems generally rely on volatile byte-addressable memory as system random access memory (RAM) that stores runtime data associated with executing code with the expectation that this system RAM is cleared when the computer system is powered down or restarted, and generally rely on non-volatile block-addressable storage devices for long-term persistent data storage, and sometimes as a place to temporarily store data (e.g., cold memory pages) when there is a shortage of available system RAM.

While volatile DRAM has historically been the dominant form of available byte-addressable memory, recent hardware developments have produced practical forms of non-volatile byte-addressable memory. Various forms of non-volatile byte-addressable memory are referred to as persistent memory (PMEM) or non-volatile random-access memory (NVRAM), and example technologies include phase-change memory (PCM), ferroelectric random-access memory (FeRAM), magnetoresistive random-access memory (MRAM), and resistive random-access memory (ReRAM). Unlike volatile byte-addressable memory such as DRAM, non-volatile byte-addressable memories do not lose their contents in the absence of electrical power. While performance characteristics vary, non-volatile byte-addressable memory technologies frequently have latencies and bandwidths that fall between those of volatile byte-addressable memory (e.g., DRAM) and non-volatile block-addressable storage devices (e.g., HDDs, SSDs, etc.). Additionally, some non-volatile byte-addressable memory technologies have a cost per unit of capacity that is less than DRAM.

BRIEF SUMMARY

Due to the performance and cost characteristics of non-volatile byte-addressable memories (e.g., PMEM, NVRAM, etc.), recent research and development has focused on expanding the concept of system RAM to include a combination of non-volatile byte-addressable memory and volatile byte-addressable memory (e.g., DRAM). Some techniques enable enlightened applications to discover the presence of a pool of non-volatile byte-addressable memory, and to request a direct memory allocation from that pool into the application's memory space for use as the application sees fit. Other techniques utilize a pool of non-volatile byte-addressable memory to transparently improve memory management and application performance by automatically offloading portions of cached memory data from system RAM to the non-volatile byte-addressable memory (e.g., as an alternative to discarding that cached memory data or paging that cached memory data to a block-based device).

However, because they are non-volatile, the data stored on non-volatile byte-addressable memories survives system restarts/reboots and losses of power. This can violate expectations under which applications were developed—namely, that the contents of system RAM are cleared if there is an interruption of power (e.g., when a system is restarted, rebooted, or powered-off; if RAM hardware is physically removed; etc.) and that it is thus relatively safe to store sensitive data in system RAM. Thus, most applications therefore place data in system RAM with the presumption that this data will not be stored "at rest," and that there is therefore no need to apply cryptographic protections to that data.

At least some embodiments herein operate to enable use of non-volatile byte-addressable memories in connection with system RAM, while ensuring that data stored on non-volatile byte-addressable memories is cryptographically protected. In embodiments, when a portion of data is to be copied from a volatile byte-addressable memory to a non-volatile byte-addressable memory, a memory manager considers a cryptographic policy associated with that data, together with cryptographic capabilities of the non-volatile byte-addressable memory (if any), and uses software encryption to ensure that data placed on the non-volatile byte-addressable memory is protected per the cryptographic policy if the non-volatile byte-addressable memory does not, itself, provide sufficient cryptographic protections. As such, the memory manager intelligently operates to protect data being copied from the volatile byte-addressable memory to the non-volatile byte-addressable memory—leveraging cryptographic capabilities of the non-volatile byte-addressable memory when sufficient—and using software encryption when cryptographic capabilities of the non-volatile byte-addressable memory are insufficient.

In some embodiments, methods, systems, and computer program products ensure data security when tiering volatile and non-volatile byte-addressable memory. In embodiments, tiering volatile and non-volatile byte-addressable memory means arranging these memories such that the volatile byte-addressable memory is a primary memory tier, and the non-volatile byte-addressable memory is a secondary memory tier. In this arrangement, applications interact with the primary memory tier (i.e., the volatile byte-addressable memory), while an operating system (OS) offloads cache data from the primary memory tier to the secondary memory tier (i.e., the non-volatile byte-addressable memory). These embodiments provide (or operate within) computing environments comprising a processor, a first memory that is byte-addressable and volatile, and a second memory that is byte-addressable and non-volatile, and operate to ensure data security when copying data from the first memory to the second memory. These embodiments identify one or more portions of cache data stored in the first memory that are to be copied to the second memory. Each portion of cache data is associated with a corresponding set of cryptographic requirements for storing the portion of cache data on non-volatile storage. These embodiments also identify a set of cryptographic capabilities of the second memory. For each of the one or more portions of cache data that are to be copied to the second memory, these embodiments perform one of (i) when each requirement in the corresponding set of cryptographic requirements is met by the set of cryptographic capabilities, copying the portion of cache data to the second memory while relying on the second memory to encrypt the portion of cache data, or (ii) when at least one requirement in the corresponding set of cryptographic requirements is not met by the set of cryptographic capabilities encrypting the portion of cache data to generate an encrypted portion of cache data and copying the encrypted portion of cache data to the second memory.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
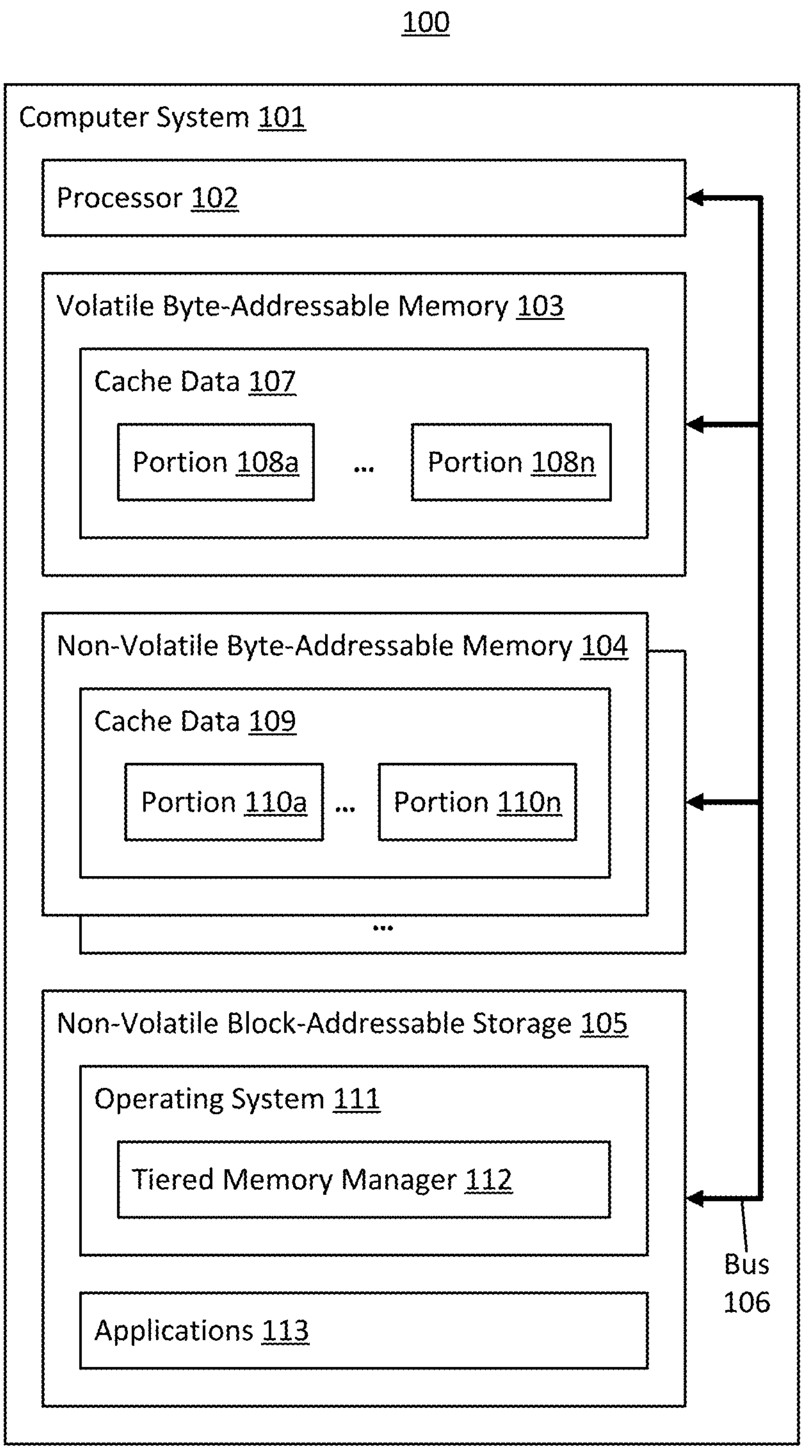
FIG. 1 illustrates an example computer architecture that facilitates ensuring data security when tiering volatile and non-volatile byte-addressable memory.

FIG. 1 illustrates an example computer architecture 100 that facilitates ensuring data security when tiering volatile and non-volatile byte-addressable memory. As shown, computer architecture 100 comprises a computer system 101, which in turn comprises a processor 102 (i.e., one or more processors), a volatile byte-addressable memory 103 (e.g., DRAM), a non-volatile byte-addressable memory 104 (e.g., PMEM, NVRAM, etc.), and a non-volatile block-addressable storage 105 (e.g., HDD, SSD, etc.), each interconnected by a bus 106 (or a plurality of busses).

In general, the computer system 101 is configured to manage the volatile byte-addressable memory 103 and the non-volatile byte-addressable memory 104 in a tiered manner, with the volatile byte-addressable memory 103 being a primary memory tier and the non-volatile byte-addressable memory 104 being a secondary memory tier. In particular, FIG. 1 shows that the non-volatile block-addressable storage 105 comprises computer-executable instructions and data structures corresponding to an OS 111, which includes a tiered memory manager 112. In embodiments, the tiered memory manager 112 presents the volatile byte-addressable memory 103 to applications 113 as system RAM as would be conventional, meaning that execution of applications 113 results in portions 108 of cache data 107 (e.g., portion 108*a* to portion 108*n*) being stored in the volatile byte-addressable memory 103.

In embodiments, this cache data 107 comprises memory pages (e.g., as portions 108) that have been utilized by these applications 113 including, for example, data loaded from the non-volatile block-addressable storage 105 into an application's memory space. In one example embodiment, referred to herein as the "trimmed memory" embodiment, the cache data 107 comprises memory pages (e.g., as portions 108) that have been accessed by applications 113 at some point during their execution, but that have been later trimmed or unmapped from those application's working sets. In the trimmed memory embodiment, the cache data 107 comprises a standby list, an inactive queue, etc., in which memory pages (e.g., portions 108) are arranged from most recently accessed (i.e., hottest) to least recently accessed (i.e., coldest). Conventionally, these memory pages are available to be re-mapped into application's working set again if later accessed by the application, or to be discarded and repurposed (e.g., starting with the coldest memory page) to active memory when a memory allocation is needed that cannot be otherwise fulfilled from free memory.

In another example embodiment, referred to herein as the "memory paging" embodiment, the cache data 107 comprises memory pages (e.g., as portions 108) that have been accessed by applications 113, and that are still mapped into those application's working sets. Conventionally, these memory pages may be paged out the non-volatile block-addressable storage 105 (e.g., as a page file or page partition) for later accesses when there is pressure on available memory in volatile byte-addressable memory 103; in many implementations, this page file/partition is encrypted on the non-volatile block-addressable storage 105 at the block level (e.g., using BITLOCKER, FILEVAULT, and the like), thereby protecting paged-out memory pages while they are stored at rest.

Notably, various embodiments implement the trimmed memory embodiment individually, implement the memory paging embodiment individually, or implement both the trimmed memory embodiment and the memory paging embodiment concurrently.

In embodiments, the tiered memory manager 112 uses the non-volatile byte-addressable memory 104 to automatically and transparently (i.e., to applications 113 and even to portions of OS 111) improve memory management and application performance by offloading portions 108 of cache data 107 data from the volatile byte-addressable memory 103 to the non-volatile byte-addressable memory 104 (represented as portions of cache data 109, including portion 110*a* to portion 110*n*, stored in the non-volatile byte-addressable memory 104).

Continuing the trimmed memory embodiment, instead of discarding and repurposing cold memory pages when a memory allocation is needed that cannot be otherwise fulfilled from free memory, the tiered memory manager 112 moves those cold memory pages to the non-volatile byte-addressable memory 104. By moving cold memory pages to the non-volatile byte-addressable memory 104, the tiered memory manager 112 can consider those memory pages as remaining "resident" in system RAM (rather than being discarded as before). Additionally, memory pages can be quickly restored from the non-volatile byte-addressable memory 104 to the volatile byte-addressable memory 103 using a relatively computationally inexpensive, processor-bound, byte-based memory copy operation if they later need to be mapped into an application's working set.

Continuing the memory paging embodiment, instead of paging memory pages to a page file/partition on the non-volatile block-addressable storage 105 (a relatively computationally expensive operation that occurs at the block level), the tiered memory manager 112 moves those memory pages to the non-volatile byte-addressable memory 104 using byte-level operations. Again, these memory pages can be quickly restored from the non-volatile byte-addressable memory 104 to the volatile byte-addressable memory 103 using a relatively computationally inexpensive, processor-bound, byte-based memory copy operation if they later need to be mapped into an application's working set. In some implementations, the non-volatile block-addressable storage 105 is used as a write-back cache positioned between the volatile byte-addressable memory 103 and the non-volatile block-addressable storage 105. This means that, when a memory page is paged to the non-volatile block-addressable storage 105 instead of the non-volatile block-addressable storage 105, the operation can complete without completion of a relatively slow block-based disk operation, and the memory page can then be lazily written to the non-volatile block-addressable storage 105.

Notably, applications have conventionally operated with the assumption that system RAM (i.e., volatile byte-addressable memory 103) is volatile, and that the contents of system RAM are therefore cleared if there is an interruption of power to system RAM (e.g., when a system is restarted, rebooted, or powered-off; if RAM hardware is physically removed; etc.). Thus, most applications therefore place data in system RAM with the presumption that this data will not be stored "at rest," and that there is therefore no need to apply cryptographic protections to that data. However, since data stored by the non-volatile byte-addressable memory 104 survives losses of power, if the tiered memory manager 112 offloads portions 108 of cache data 107 data to the non-volatile byte-addressable memory 104 (using either of the trimmed memory embodiment or the memory paging embodiment), the tiered memory manager 112 could violate these presumptions and leave potentially confidential data accessible to malicious parties. Accordingly, in the embodiments herein, the tiered memory manager 112 is configured to intelligently operate to protect data being copied from the volatile byte-addressable memory 103 to the non-volatile byte-addressable memory 104.

Figure 2:
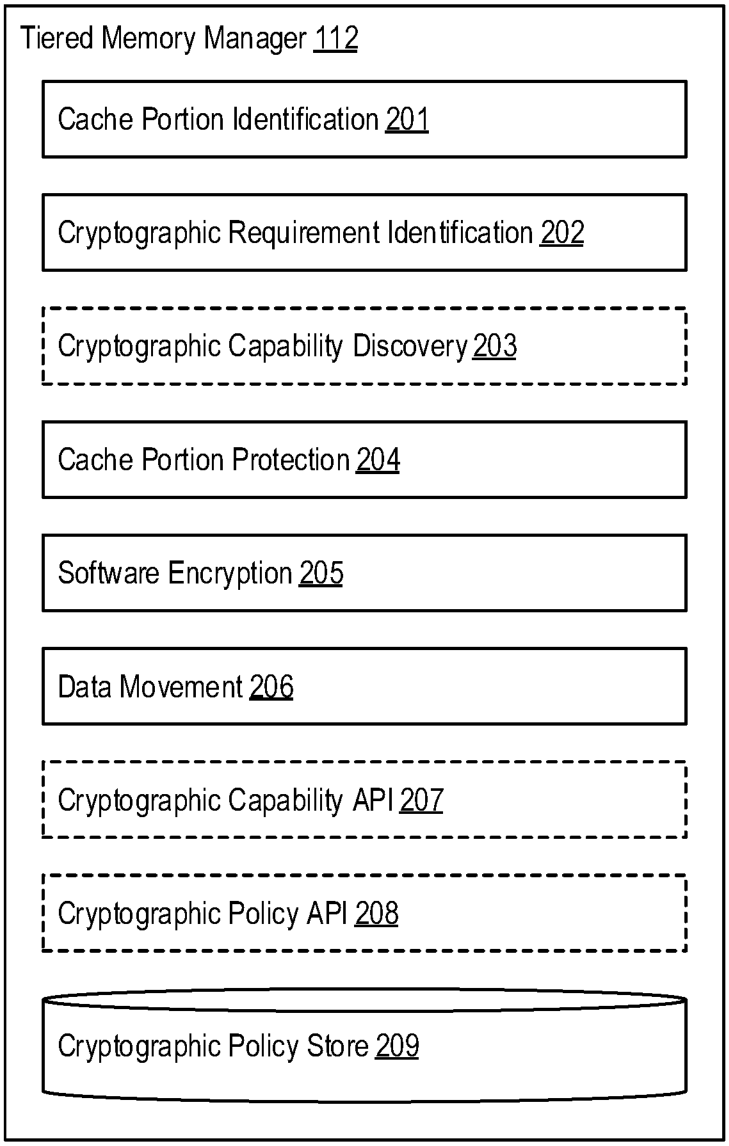
FIG. 2 illustrates an example of a tiered memory manager.

To illustrate operation of the tiered memory manager 112, FIG. 2 details further internal components of the tiered memory manager 112 of FIG. 1. As illustrated, the tiered memory manager 112 comprises one or more of a cache portion identification component 201, a cryptographic requirement identification component 202, a cryptographic capability discovery component 203, a cache portion protection component 204, a software encryption component 205, a data movement component 206, a cryptographic capability application programming interface (API) 207, a cryptographic policy API 208, and cryptographic policy store 209, that each represent functions that the tiered memory manager 112 implements in accordance with various embodiments described herein. It will be appreciated that the depicted components—including their identity and arrangement—are presented merely as an aid in describing various embodiments of the tiered memory manager 112 described herein, and that these components are non-limiting to how software and/or hardware might implement various embodiments of the tiered memory manager 112 described herein, or of the particular functionality thereof.

The cache portion identification component 201 identifies one or more portions 108 of cache data 107 stored in the volatile byte-addressable memory 103 that are to be copied to the non-volatile byte-addressable memory 104 (i.e., as one or more of portions 110 of cache data 109). In some embodiments, the portions 108 comprise memory pages (e.g., as portions 108) that have been accessed by applications 113 at some point during their execution, but that have been later trimmed or unmapped from those application's working sets (i.e., the trimmed memory embodiment). In additional, or alternative, embodiments, the portions 108 comprise memory pages (e.g., as portions 108) that have been accessed by applications 113, and that are still mapped into those application's working sets (i.e., the memory paging embodiment).

The cryptographic requirement identification component 202 determines one or more cryptographic requirements applicable to protecting the one or more portions 108 identified by the cache portion identification component 201. In embodiments, these cryptographic requirements comprise cryptographic key lifetime (e.g., a length of time, until a system reboot, etc.), cryptographic key length (e.g., 128-bit, 192-bit, 256-bit, etc.), cryptographic algorithm (e.g., AES, Triple DES, Twofish, etc.), and the like. In some embodiments the cryptographic requirement identification component 202 identifies a single set of cryptographic requirements that are applicable to all data that is copied from the volatile byte-addressable memory 103 to the non-volatile byte-addressable memory 104.

In other embodiments, the cryptographic requirement identification component 202 identifies multiple sets of cryptographic requirements, with each set being applicable to subsets of data that is copied from the volatile byte-addressable memory 103 to the non-volatile byte-addressable memory 104. For example, in FIG. 2 the cryptographic policy store 209 represents functionality of the tiered memory manager 112 to store different sets of cryptographic requirements, and which are accessed by the cryptographic requirement identification component 202. For example, in some embodiments, the cryptographic policy store 209 stores different sets of cryptographic requirements for different applications in applications 113, and thus the cryptographic requirement identification component 202 identifies different sets of cryptographic requirements for different ones of portions 108, based on which of the applications 113 those portions 108 correspond to. In some embodiments, and as represented by the cryptographic policy API 208, the tiered memory manager 112 provides and API enabling applications to specify cryptographic requirements.

If present, the cryptographic capability discovery component 203 discovers one or more hardware-based cryptographic capabilities, if any, of the non-volatile byte-addressable memory 104. In some implementations, the non-volatile byte-addressable memory 104 includes some capability (e.g., by a memory controller) to automatically encrypt data copied to the non-volatile byte-addressable memory 104. Thus, in some embodiments the cryptographic capability discovery component 203 discovers a set of one or more cryptographic capabilities of the non-volatile byte-addressable memory 104. In embodiments, these cryptographic capabilities comprise cryptographic key lifetime (e.g., a length of time, until a system reboot, etc.), cryptographic key length (e.g., 128-bit, 192-bit, 256-bit, etc.), cryptographic algorithm (e.g., AES, Triple DES, Twofish, etc.), and the like. In other implementations, the non-volatile byte-addressable memory 104 lacks any capability to automatically encrypt data copied to the non-volatile byte-addressable memory 104. Thus, in some embodiments the cryptographic capability discovery component 203 discovers no cryptographic capabilities of the non-volatile byte-addressable memory 104 (i.e., an empty set of cryptographic capabilities).

The cache portion protection component 204 considers which portion(s) 108 of cache data 107 were identified by the cache portion identification component 201, which set(s) of cryptographic requirements were identified by the cryptographic requirement identification component 202 as being relevant to the identified portion(s) 108, and which cryptographic capabilities (if any) were identified by the cryptographic capability discovery component 203. The cache portion protection component 204 then determines how to ensure that the set of cryptographic requirements associated with each portion 108 identified by the cache portion protection component 204 is met when the portion 108 is copied to the non-volatile byte-addressable memory 104.

In embodiments, when each cryptographic requirement for a given portion 108 is met by cryptographic capabilities of the non-volatile byte-addressable memory 104, the data movement component 206 copies that portion 108 to the non-volatile byte-addressable memory 104. In these embodiments, the cache portion protection component 204 relies on the non-volatile byte-addressable memory 104, itself, to encrypt the portion 108 prior to durably storing the portion 108. In these embodiments, the tiered memory manager 112 provides a technical effect of ensuring that data is protected at rest when copied from the volatile byte-addressable memory 103 in a manner that meets cryptographic requirements for that data, while utilizing performant hardware-based cryptographic capabilities of the non-volatile byte-addressable memory 104.

In embodiments, when at least one cryptographic requirement for a given portion 108 is not met by cryptographic capabilities of the non-volatile byte-addressable memory 104, software encryption component 205 encrypts that portion 108 using the processor 102, and then the data movement component 206 copies that encrypted portion 108 to the non-volatile byte-addressable memory 104. While termed herein "software encryption," some embodiments the software encryption component 205 relied on one or more hardware cryptographic accelerators, such as cryptographic processor extension (e.g., INTEL AES-NI (trade mark)). In these embodiments, the tiered memory manager 112 provides a technical effect of ensuring that data is protected at rest when copied from the volatile byte-addressable memory 103 in a manner that meets cryptographic requirements for that data, even when the non-volatile byte-addressable memory 104 lacks any cryptographic capabilities, or when the non-volatile byte-addressable memory 104 lacks sufficient cryptographic capabilities.

In some embodiments, the tiered memory manager 112 also enables enlightened applications to request direct allocations of the non-volatile byte-addressable memory 104. Thus, the tiered memory manager 112 is illustrated as potentially including a cryptographic capability API component 207. In embodiments, when queried, the cryptographic capability API component 207 returns the cryptographic capabilities (if any) of the non-volatile byte-addressable memory 104, as obtained using the cryptographic capability discovery component 203. In embodiments, enlighten applications are permitted to decided whether or not to request a memory allocation based on these cryptographic capabilities. In other embodiments, the tiered memory manager 112 refuses an allocation to enlighten applications if the cryptographic capabilities do not meet a particular set of cryptographic requirements.

The following discussion now refers to a number of methods and method acts. Although the method acts may be discussed in certain orders, or may be illustrated in a flow chart as occurring in a particular order, no particular ordering is required unless specifically stated, or required because an act is dependent on another act being completed prior to the act being performed.

Figure 3A:
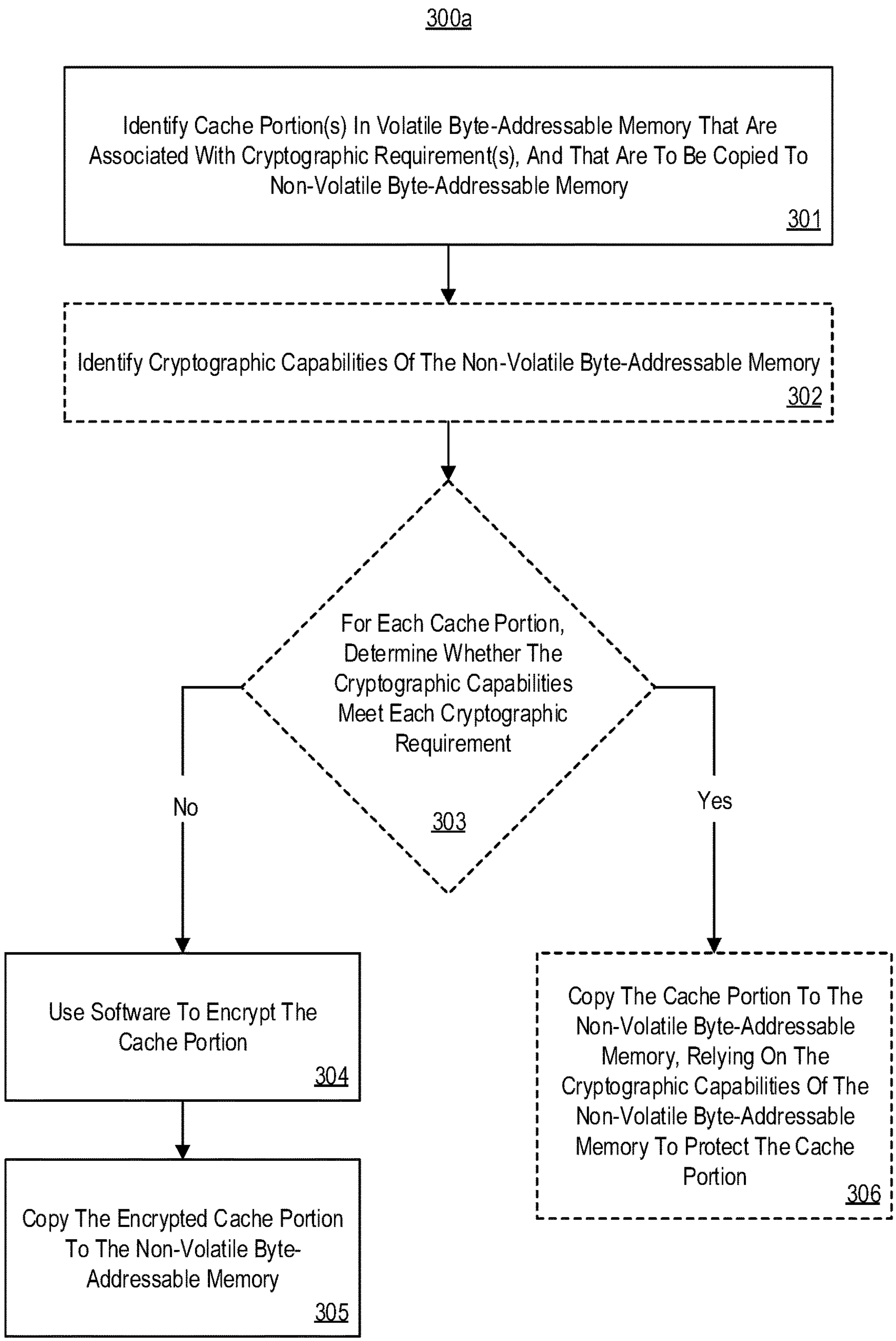
FIG. 3A illustrates a flow chart of an example method for ensuring data security when copying data from a first memory that is byte-addressable and volatile to a second memory that is byte-addressable and non-volatile.

FIG. 3A illustrates a flow chart of an example method 300*a* for ensuring data security when copying data from a first memory that is byte-addressable and volatile to a second memory that is byte-addressable and non-volatile. Method 300*a* will be described with respect to the components and data of computer architecture 100.

Method 300*a* comprises an act 301 of identifying cache portion(s) in volatile byte-addressable memory that are associated with cryptographic requirement(s), and that are to be copied to non-volatile byte-addressable memory. In some embodiments, act 301 comprises identifying one or more portions of cache data stored in the first memory that are to be copied to the second memory, each portion of cache data being associated with a corresponding set of cryptographic requirements for storing the portion of cache data on non-volatile storage. In an example, the cache portion identification component 201 identifies one or more portions 108 of cache data 107 stored in the volatile byte-addressable memory 103. As discussed in the trimmed memory embodiment, the one or more portions of cache data may comprise one or more trimmed memory pages in a standby list, with the coldest memory page(s) being copied to the second memory (i.e., the non-volatile byte-addressable memory 104) instead of being discarded. As discussed in the memory paging embodiment, the one or more portions of cache data may comprise one or more memory pages copied to a page file stored on the second memory (i.e., the non-volatile byte-addressable memory 104).

As represented by the cryptographic policy store 209, these portions 108 are associated with one or more sets of cryptographic requirements—such as one or more of a cryptographic key lifetime, a cryptographic key length, or a cryptographic algorithm—and are identifiable by the cryptographic requirement identification component 202. In some embodiments, each portion of cache data is associated with a common set of cryptographic requirements. In these embodiments, the cryptographic policy store 209 stores a single set of cryptographic requirements applicable to all of the cache data 107. In other embodiments, different portions 108 of the cache data 107 are associated with different sets of cryptographic requirements, such as on a per-application basis, such that the one or more portions of cache data comprise (i) a first portion of cache data associated with a corresponding first set of cryptographic requirements, and (ii) a second portion of cache data associated with a corresponding second set of cryptographic requirements.

In embodiments, method 300*a* comprises an act 302 of identifying cryptographic capabilities of the non-volatile byte-addressable memory. In some embodiments, act 302 comprises identifying a set of cryptographic capabilities of the second memory. In an example, the cryptographic capability discovery component 203 discovers cryptographic capabilities of the non-volatile byte-addressable memory 104, if any. In embodiments, cryptographic capabilities include includes one or more of a cryptographic key lifetime, a cryptographic key length, or a cryptographic algorithm. In embodiments in which the non-volatile byte-addressable memory 104 lacks any cryptographic capability, then in act 302 the set of cryptographic capabilities is an empty set.

In embodiments, method 300*a* comprises an act 303 of, for each cache portion, determining whether the cryptographic capabilities meet each cryptographic requirement. In some embodiments, act 303 comprises, for each of the one or more portions of cache data that are to be copied to the second memory, determining whether each requirement in the corresponding set of cryptographic requirements is met by the set of cryptographic capabilities. In an example, for each cache portion, the cache portion protection component 204 determines whether the cryptographic requirement(s) for the cache portion are met by cryptographic capabilities of the non-volatile byte-addressable memory 104. As shown, act 303 is a decision block that comprises a "no" path to act 304 and act 305 when at least one requirement in the corresponding set of cryptographic requirements is not met by the set of cryptographic capabilities, or a "yes" path to act 306 when each requirement in the corresponding set of cryptographic requirements is met by the set of cryptographic capabilities. Thus, based on the outcome of the determination in act 303, method 300*a* takes one of the "no" path to act 304 and act 305 or the yes" path to act 306. Notably, by taking different paths depending on the cryptographic capabilities of non-volatile byte-addressable memory 104, act 303 facilitates an inventive step of utilizing efficient hardware encryption capabilities of the non-volatile byte-addressable memory 104 when they are sufficient, while ensuring that data is protected according to the policy when hardware encryption capabilities of the non-volatile byte-addressable memory 104 are insufficient to meet that policy.

When following the "no" path from act 303 (i.e., when at least one requirement in the corresponding set of cryptographic requirements is not met by the set of cryptographic capabilities), method 300*a* comprises act 304 of using software to encrypt the cache portion. In some embodiments, act 304 comprises encrypting the portion of cache data to generate an encrypted portion of cache data. In an example, the cache portion protection component 204 instructs the software encryption component 205 to encrypt the cache portion using the processor 102. Thus, in embodiments, act 304 comprises executing one or more software instructions at the processor to encrypt the portion of cache data. As explained, in embodiments, software encryption can utilize hardware accelerators. Thus, in embodiments, the one or more software instructions leverage a hardware encryption acceleration capability of the processor. When following the "no" path from act 303, method 300*a* also comprises act 305 of copying the encrypted cache portion to the non-volatile byte-addressable memory. In some embodiments, act 305 comprises copying the encrypted portion of cache data to the second memory. In an example, the data movement component 206 copies the encrypted cache portion (i.e., which was generated in act 304) to the non-volatile byte-addressable memory 104. Notably, unlike copying data to the non-volatile block-addressable storage 105, in embodiments copying the encrypted portion of cache data to the second memory in act 305 is a processor-bound memory copy operation. In acts 304 and 305, the tiered memory manager 112 provides a technical effect of ensuring that data is protected at rest when copied from the volatile byte-addressable memory 103 in a manner that meets cryptographic requirements for that data, even when the non-volatile byte-addressable memory 104 lacks any cryptographic capabilities, or when the non-volatile byte-addressable memory 104 lacks sufficient cryptographic capabilities.

Alternatively, when following the "yes" path from act 303 (i.e., when each requirement in the corresponding set of cryptographic requirements is met by the set of cryptographic capabilities), method 300*a* comprises act 306 of copying the cache portion to the non-volatile byte-addressable memory, relying on the cryptographic capabilities of the non-volatile byte-addressable memory to protect the cache portion. In some embodiments, act 306 comprises copying the portion of cache data to the second memory while relying on the second memory to encrypt the portion of cache data. In an example, the data movement component 206 copies the unencrypted cache portion to the non-volatile byte-addressable memory 104, relying on the non-volatile byte-addressable memory 104 to encrypt the cache portion. Notably, unlike copying data to the non-volatile block-addressable storage 105, in embodiments copying the portion of cache data to the second memory in act 306 is a processor-bound memory copy operation. In act 306, the tiered memory manager 112 provides a technical effect of ensuring that data is protected at rest when copied from the volatile byte-addressable memory 103 in a manner that meets cryptographic requirements for that data, while utilizing performant hardware-based cryptographic capabilities of the non-volatile byte-addressable memory 104.

Notably, in embodiments in which different portions 108 of the cache data 107 are associated with different sets of cryptographic requirements, such as on a per-application basis, method 300*a* may take the "no" path from act 303 for some cache portions and take the "yes" path from act 303 for other cache portions. For example, in some embodiments, method 300*a* comprises both of (i) based on at least one requirement in the corresponding first set of cryptographic requirements being met by the set of cryptographic capabilities, copying a first portion of cache data to the second memory while relying on the second memory to encrypt the first portion of cache data, and (ii) based on at least one requirement in the corresponding second set of cryptographic requirements not being met by the set of cryptographic capabilities, encrypting a second portion of cache data to generate an encrypted second portion of cache data, and copying the encrypted second portion of cache data to the second memory.

As discussed in connection with FIG. 2, some embodiments of the tiered memory manager 112 include a cryptographic capability API component 207 that enables enlightened applications to discover capabilities of the non-volatile byte-addressable memory 104. Thus, in some embodiments, method 300*a* also comprises comprising presenting a first API to at least one application executing at the processor, the first API identifying a least a portion of the set of cryptographic capabilities. Additionally, as discussed in connection with FIG. 2, some embodiments of the tiered memory manager 112 include a cryptographic policy API 208 that enables applications to specify their cryptographic requirements. Thus, in embodiments, method 300*a* also comprises presenting a second API to at least one application executing at the processor, the second API enabling specification of at least one set of cryptographic requirements.

Figure 3B:
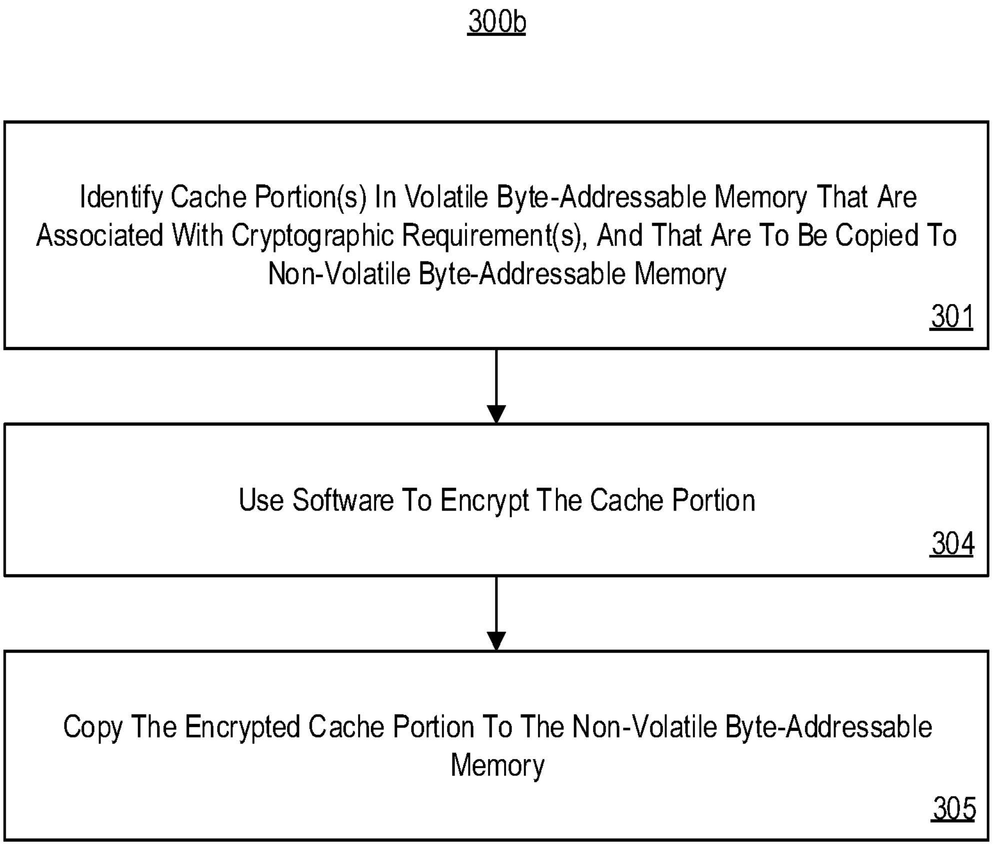
FIG. 3B illustrates a flow chart of an example method for ensuring data security when copying data from a first memory that is byte-addressable and volatile to a second memory that is byte-addressable and non-volatile.

Notably, in FIG. 3A, acts 302, 303, and 306 are shown in broken lines to indicate that in some embodiments these acts are optional or omitted. That is, in some embodiments, method 300*a* operates under the assumption that the non-volatile byte-addressable memory 104 lacks requisite (or any) cryptographic capability, and always performs software encryption. In these embodiments, the tiered memory manager 112 may omit the cryptographic capability discovery component 203 (as indicated by broken lines in FIG. 2). In order to more expressly illustrate this embodiment, FIG. 3B illustrates a flow chart of an example method 300*b* for ensuring data security when copying data from a first memory that is byte-addressable and volatile to a second memory that is byte-addressable and non-volatile. FIG. 3B, method 300*b* includes acts 301, 304, and 305 from method 300*a*, but lacks acts 302, 303, and 306.

Accordingly, the embodiments herein operate to enable use of non-volatile byte-addressable memories in connection system RAM, while ensuring that data stored on non-volatile byte-addressable memories is cryptographically protected. When a portion of data is to be copied from a volatile byte-addressable memory to a non-volatile byte-addressable memory, embodiments consider a cryptographic policy associated with that data, together with cryptographic capabilities of the non-volatile byte-addressable memory (if any), and use software encryption to ensure that data placed on the non-volatile byte-addressable memory is protected per the cryptographic policy if the non-volatile byte-addressable memory does not, itself, provide sufficient cryptographic protections. As such, embodiments intelligently operate to protect data being copied from the volatile byte-addressable memory to the non-volatile byte-addressable memory—leveraging cryptographic capabilities of the non-volatile byte-addressable memory when sufficient—and using software encryption when cryptographic capabilities of the non-volatile byte-addressable memory are insufficient.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. When introducing elements in the appended claims, the articles "a," "an," "the," and "said" are intended to mean there are one or more of the elements. The terms "comprising," "including," and "having" are intended to be inclusive and mean that there may be additional elements other than the listed elements.

What is claimed:

1. A method, implemented at a computer system that includes a processor, comprising:

identifying a portion of cache data stored in a first memory that is byte-addressable and volatile that is to be copied to a second memory that is byte-addressable and non-volatile, the portion of cache data being associated with a cryptographic requirement for storing the portion of cache data on non-volatile storage, wherein the cryptographic requirement includes one or more of a required cryptographic key lifetime, a required cryptographic key length, or a required cryptographic algorithm;

discovering, by querying a memory-controller interface of the second memory, a cryptographic capability of the second memory, wherein the cryptographic capability includes one or more of a cryptographic key lifetime, a cryptographic key length, or a cryptographic algorithm used by the second memory when the second memory automatically encrypts data copied to the second memory;

determining that the cryptographic requirement is met by the cryptographic capability; and based on the cryptographic requirement being met by the cryptographic capability, copying, by a byte-addressable memory operation, the portion of cache data to the second memory while relying on the second memory to encrypt the portion of cache data.

2. The method of claim 1, wherein identifying the portion of cache data comprises identifying a plurality of portions of cache data, each portion of cache data being associated with the cryptographic requirement.

3. The method of claim 1, wherein the portion of cache data comprises a trimmed memory page in a standby list.

4. The method of claim 1, wherein the portion of cache data comprises an active memory pages copied to a page file.

5. The method of claim 1, further comprising presenting a first application programming interface (API) to an application executing at the processor, the first API identifying the cryptographic capability.

6. The method of claim 1, further comprising presenting a second application programming interface (API) to an application executing at the processor, the second API enabling specification of the cryptographic requirement.

7. The method of claim 1, wherein copying the portion of cache data to the second memory is a processor-bound operation.

8. A method, implemented at a computer system that includes a processor, a first memory that is byte-addressable and volatile, and a second memory that is byte-addressable and non-volatile, comprising:

identifying a portion of cache data stored in a first memory that is byte-addressable and volatile that is to be copied to a second memory that is byte-addressable and non-volatile, the portion of cache data being associated with a cryptographic requirement for storing the portion of cache data on non-volatile storage, wherein the cryptographic requirement includes one or more of a required cryptographic key lifetime, a required cryptographic key length, or a required cryptographic algorithm;

discovering, by querying a memory-controller interface of the second memory, a cryptographic capability of the second memory, wherein the cryptographic capability includes one or more of a cryptographic key lifetime, a cryptographic key length, or a cryptographic algorithm used by the second memory when the second memory automatically encrypts data copied to the second memory;

determining that the cryptographic requirement is not met by the cryptographic capability;

based on the cryptographic requirement being not met by the cryptographic capability, encrypting the portion of cache data to generate an encrypted portion of cache data; and copying, by a byte-addressable memory operation, the encrypted portion of cache data to the second memory.

9. The method of claim 8, wherein identifying the portion of cache data comprises identifying a plurality of portions of cache data, each portion of cache data being associated with the cryptographic requirement.

10. The method of claim 8, wherein the portion of cache data comprises a trimmed memory page in a standby list.

11. The method of claim 8, wherein the portion of cache data comprises an active memory page copied to a page file.

12. The method of claim 9, further comprising presenting a first application programming interface (API) to an application executing at the processor, the first API identifying the cryptographic capability.

13. The method of claim 8, further comprising presenting a second application programming interface (API) to an application executing at the processor, the second API enabling specification of the cryptographic requirement.

14. The method of claim 8, wherein encrypting the portion of cache data to generate the encrypted portion of cache data comprises executing an instruction at the processor to encrypt the portion of cache data.

15. The method of claim 14, wherein the instruction leverages a hardware encryption acceleration capability of the processor.

16. A computer system comprising:

a processor;

a first memory that is byte-addressable and volatile;

a second memory that is byte-addressable and non-volatile; and a computer-readable medium that stores computer-executable instructions that are executable by the processor to cause the computer system to at least:

discover, by querying a memory-controller interface of the second memory, a cryptographic capability of the second memory, wherein the cryptographic capability includes one or more of a cryptographic key lifetime, a cryptographic key length, or a cryptographic algorithm used by the second memory when the second memory automatically encrypts data copied to the second memory;

identify a first portion of cache data stored in the first memory that is to be copied to the second memory, the first portion of cache data being associated with a first cryptographic requirement for storing the first portion of cache data on non-volatile storage, wherein the first cryptographic requirement includes one or more of a first required cryptographic key lifetime, a first required cryptographic key length, or a first required cryptographic algorithm;

determine that the first cryptographic requirement is met by the cryptographic capability;

based on the first cryptographic requirement being met by the cryptographic capability, copy, by a byte-addressable memory operation, the first portion of cache data to the second memory while relying on the second memory to encrypt the first portion of cache data;

identify a second portion of cache data stored in the first memory that is to be copied to the second memory, the second portion of cache data being associated with a second cryptographic requirement for storing the second portion of cache data on non-volatile storage, wherein the second cryptographic requirement includes one or more of a second required cryptographic key lifetime that is different from the first required cryptographic key lifetime, a second required cryptographic key length that is different from the first required cryptographic key length, or a second required cryptographic algorithm that is different from the first required cryptographic algorithm;

determine that the second cryptographic requirement is not met by the cryptographic capability; and based on the second cryptographic requirement being not met by the cryptographic capability, encrypt the second portion of cache data to generate an encrypted portion of cache data; and copy the encrypted portion of cache data to the second memory.

17. The computer system of claim 16, wherein the first portion of cache data comprises a trimmed memory page in a standby list.

18. The computer system of claim 16, wherein the first portion of cache data comprises an active memory page copied to a page file.

19. The computer system of claim 16, wherein the computer-executable instructions are also executable by the processor to cause the computer system to present an application programming interface (API) to an application executing at the processor, the API identifying the cryptographic capability.

20. The computer system of claim 16, wherein the computer-executable instructions are also executable by the processor to cause the computer system to present an application programming interface (API) to an application executing at the processor, the API enabling specification of cryptographic requirements.

* * * * *